United States Patent
Yoshida et al.

(10) Patent No.: US 6,339,650 B1
(45) Date of Patent: *Jan. 15, 2002

(54) IMAGE INFORMATION PROCESSING APPARATUS

(75) Inventors: Eiichi Yoshida; Yoshikazu Ikenoue; Takeshi Morikawa, all of Toyokawa (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/511,139

(22) Filed: Aug. 4, 1995

Related U.S. Application Data

(63) Continuation of application No. 08/169,523, filed on Dec. 17, 1993, now abandoned.

(30) Foreign Application Priority Data

Dec. 21, 1992 (JP) .............................................. 4-339908

(51) Int. Cl.[7] .................................................. G06K 9/00
(52) U.S. Cl. ........................ 382/100; 358/401; 358/403; 399/42
(58) Field of Search ................................ 382/100, 112, 382/317, 305, 306; 283/72, 902; 358/401, 403, 404; 399/45, 38, 42

(56) References Cited

U.S. PATENT DOCUMENTS

| | | | | |
|---|---|---|---|---|
| 4,182,568 A | * | 1/1980 | Levine | 358/401 |
| 4,574,395 A | * | 3/1986 | Kato | 382/306 |
| 4,837,737 A | | 6/1989 | Watanabe | 364/900 |
| 4,891,666 A | * | 1/1990 | Gordon | 283/72 |
| 5,057,936 A | * | 10/1991 | Bares | 358/405 |
| 5,060,980 A | * | 10/1991 | Johson et al. | 283/70 |
| 5,129,016 A | * | 7/1992 | Murakami et al. | 382/61 |
| 5,149,140 A | * | 9/1992 | Mowry, Jr. et al. | 283/93 |
| 5,257,119 A | | 10/1993 | Funada et al. | 358/438 |
| 5,299,026 A | * | 3/1994 | Vincett et al. | 382/305 |
| 5,315,098 A | * | 5/1994 | Tow | 235/494 |
| 5,317,646 A | * | 5/1994 | Sang, Jr. et al. | 382/217 |
| 5,822,023 A | * | 10/1998 | Ito et al. | 358/403 |
| 5,991,466 A | * | 11/1999 | Ushiro et al. | 382/305 |
| 6,154,779 A | * | 11/2000 | Otani et al. | 358/404 |

FOREIGN PATENT DOCUMENTS

| | | | | |
|---|---|---|---|---|
| EP | 0493091 A1 | * | 7/1992 | ......... H04N/1/387 |
| JP | 62-219769 | | 9/1987 | |
| JP | 2-111161 | | 4/1990 | |
| JP | 2-114287 | | 4/1990 | |
| JP | 2-284189 | | 11/1990 | |

OTHER PUBLICATIONS

"Composition and Coding Method of Images and Characters by Employing Ternary Density Pattern," *Image Electronics Institute* (Gazodenshigakkai) Magazine, vol. 17, No. 1 (1988).

* cited by examiner

Primary Examiner—Jon Chang
(74) Attorney, Agent, or Firm—Sidley Austin Brown & Wood

(57) ABSTRACT

An image information processing apparatus which includes an image reading section which reads an image of a document and outputs image data, a document judging section which judges whether the read document is an original document or a reproduced document according to whether or not specific data is present in the image data, an inquiry section for visualizing inquiry data related to the original document into a visible image, and a control section which controls the inquiry section to visualize the inquiry data designated by the specific data into visible image when the read document is judged to be a reproduced document by the document judging section.

25 Claims, 7 Drawing Sheets

OVERALL CONTROL SECTION

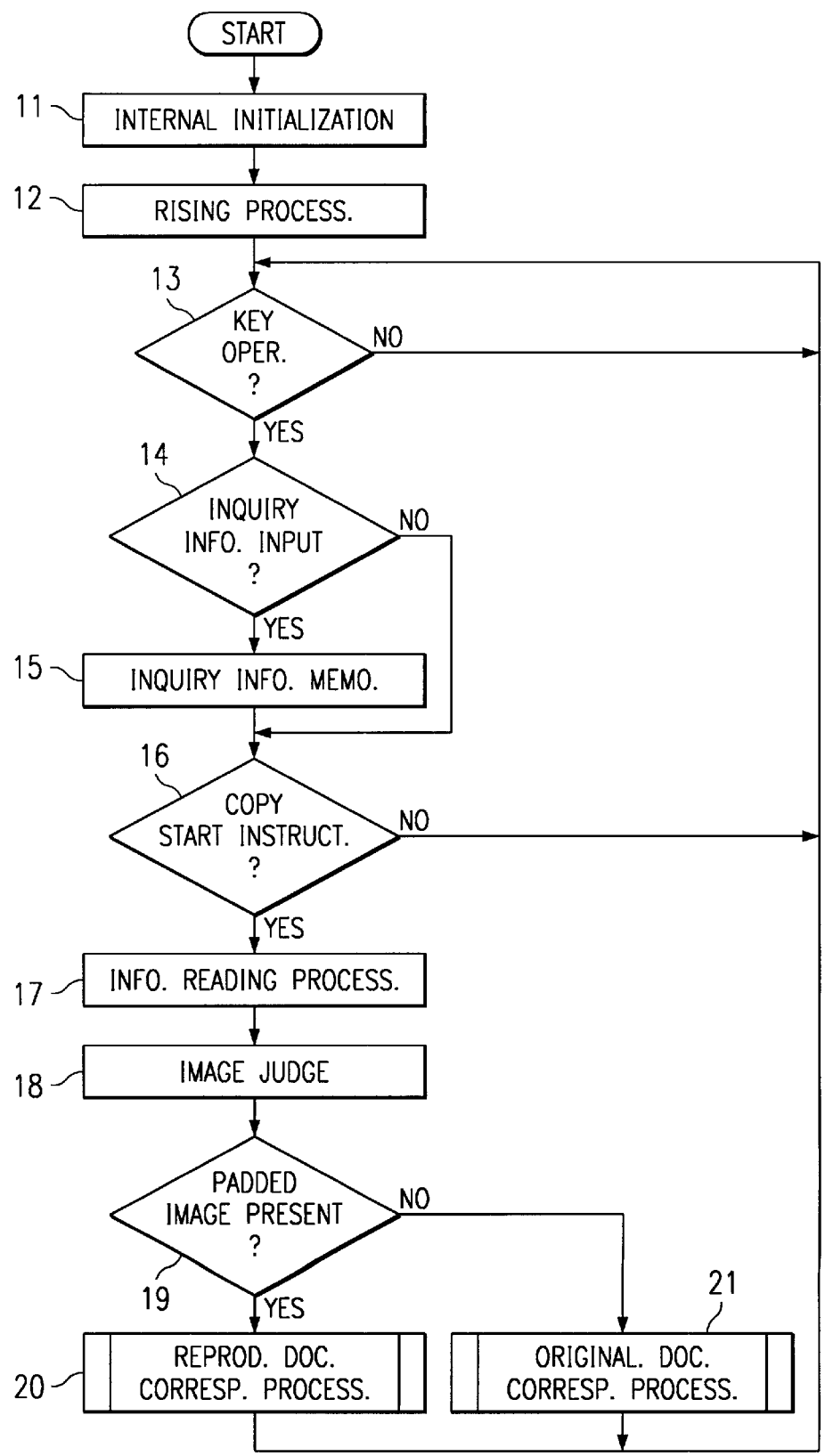

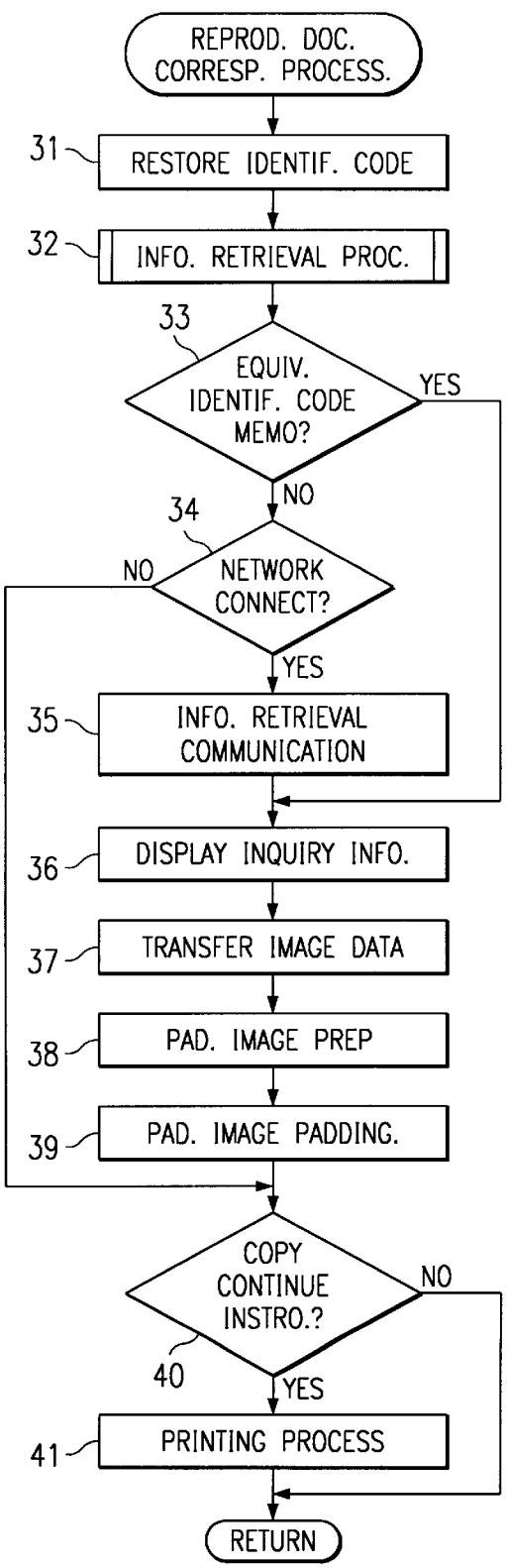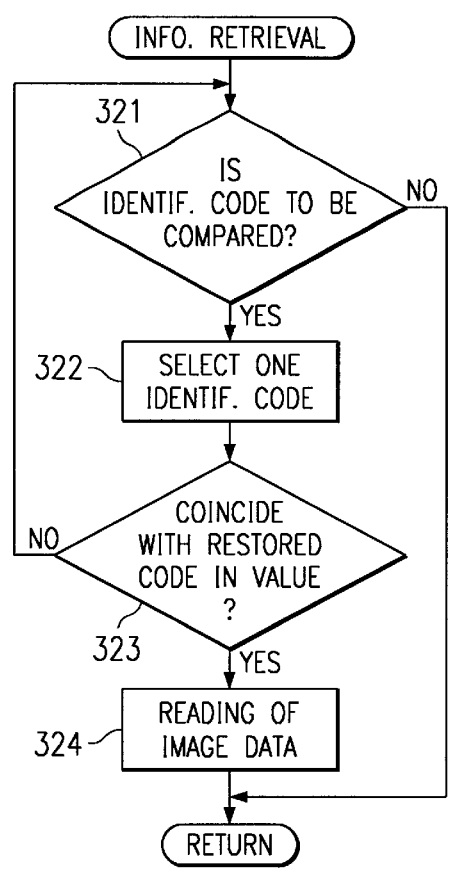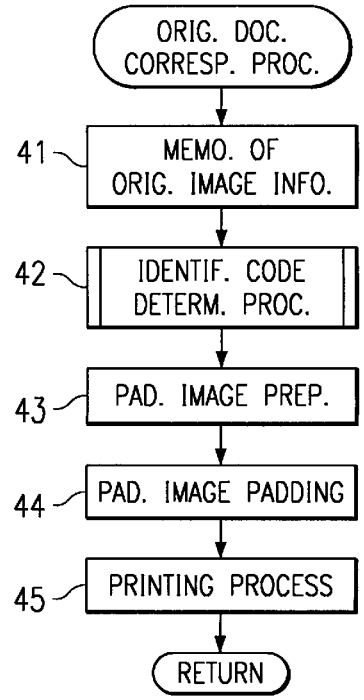

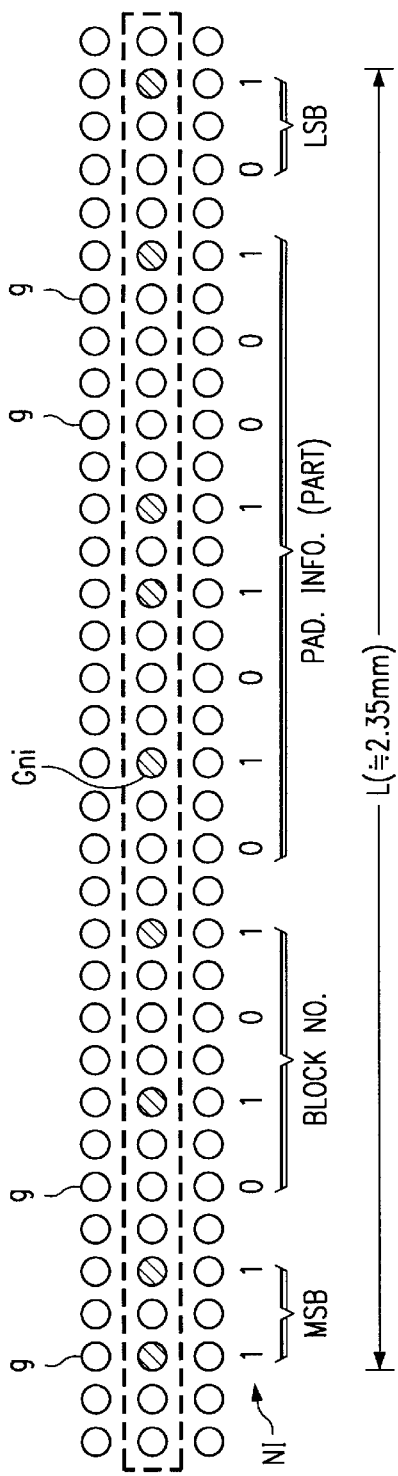
FIG. 14
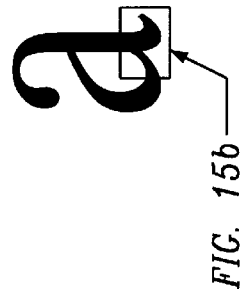
FIG. 15a
FIG. 15b

IMAGE INFORMATION PROCESSING APPARATUS

This application is a continuation, of application Ser. No. 08/169,523, filed Dec. 17, 1993 now abandoned.

BACKGROUND OF THE INVENTION

FIELD OF THE INVENTION

The present invention generally relates to image information processing, and more particularly, to a novel image information processing apparatus suitable for reproduction of hard copy images.

Copying equipment of the electrophotographic type has been widely employed in many fields of businesses and personal uses, since such equipment is capable of readily copying various documents at the location and at the number required.

Meanwhile, along with improvements in the performance of the copying equipment, the development of additional functions therefor has been continuously achieved, and a variety of such additional functions have already been placed into actual applications.

By way of example, there has been proposed a copying apparatus provided with a memory mode copy function in which, by storing the last read image formation in a semiconductor memory, processing at a higher speed is intended by omitting reading of a document in recopying, or provided with a communication function for notifying conditions of use or necessity of maintenance, etc. to external managing apparatus.

Moreover, in order to prevent secret information from being released, there is also proposed a print control practice in which outflow route search information such as date of copying, copying apparatus number, and the like is formed into codes to be padded into the copied images so as not to be recognized by the naked eye.

Incidentally, documents subjected to copying by copying equipment are broadly divided into original documents and reproduced documents obtained by the copying thereof Here, the word "original document" means an original text for the management of documents by a user of the copying apparatus. Normally, such original documents include documents prepared not by the copying apparatus, such as various printed matters including books, printed items by a printer, or hand-written documents, etc. However, there may be cases where documents prepared by other copying apparatus are used as the original documents.

In general offices, circulation or distribution of copied items by a copying apparatus is frequently carried out, and there are many cases where copied items are further made from the copied items (i.e., the cases where copying of the reproduced document is effected). The reproduced item from the original document (a primary reproduced item) is referred to as a "child" copy, and a reproduced item from the child copy (a secondary reproduced item) is called a "grandchild" copy.

In such a case as noted above, although the image reproducibility in the electrophotographic process is high, the image quality is gradually deteriorated as the reproduction is repeated, and the image quality of the "grandchild" copy tends to be slightly inferior to that of the "child" copy.

Therefore, there are often cases where it is desired to obtain a "child" copy with a favorable image quality by using the original document instead of the reproduced document when the document available at hand is of the reproduced document.

Apart from the problems related to the image quality, in the case where, for example, the document at hand is of a reproduced document copied from part of a book, it is sometimes desired to know the content of pages before and after the page at hand, i.e., the content in the pages not available at hand.

Moreover, when the document at hand is of a reproduced document prepared by amending part of the original document, there have occurred many cases where it is desired to know the content of the amended portion.

However, in the conventional practice, there have been such problems that the place where the original document is kept (or person keeping the original document) can not be easily found, and thus, the work for searching the original document is troublesome, or that it is impossible to obtain the "child" copy in the case where the original document has already been discarded.

SUMMARY OF THE INVENTION

Accordingly, an essential object of the present invention is to provide an image information processing apparatus in which, in a reproduction of a document by a copying apparatus, it is intended to readily obtain a reproduced item which is based on the original document.

Another object of the present invention is to provide an image information processing apparatus of the above described type, which is simple in construction, functionally stable and with a high reliability.

In accomplishing these and other objects, according to one aspect of the present invention, there is provided an image information processing apparatus which includes an image reading means which reads an image of a document and outputs image data, a document judging means which judges whether the read document is an original document or a reproduced document according to whether or not specific data is present in the image data, an inquiry means for visualizing inquiry data related to the original document into a visible image, the inquiry data comprising bibliographic data about the original document, and a control means which controls the inquiry means to visualize the inquiry data designated by the specific data into a visible image, when the read document is judged to be a reproduced document by said document judging means.

In another aspect of the present invention, the image information processing apparatus includes an input means for inputting inquiry data related to the original document, said inquiry data comprising bibliographic data about the original document a data forming means for producing specific data designating the inquiry data, an image information reading means which reads an image of a document and outputs image data, a document judging means which judges whether the read document is an original document or a reproduced document according to whether or not specific data is present in the image data, a composing means for preparing composed data based on the image data and the specific data, an image forming means for forming an image on a recording medium based on the composed data, and a control means which controls said composing means to prepare composed data based on the specific data and image data prepared by the data forming means, thereby to execute the image formation by said image forming means based on said composed data, when the read document is judged to be the original document by said document judging means.

In a further aspect of the present invention, the image information processing apparatus includes an image reading means which reads an image of a document and outputs image data, a document judging means which judges whether the read document is an original document or a reproduced document according to whether or not specific data is present in the image data, a memory means which preliminarily stores the image data of the original document, an image forming means for forming an image on a recording medium based on the image data, and a control means which controls said image forming means to execute image formation based on the image data stored in said memory, a reproduced document by the document judging means.

In a still further aspect of the present invention, the image information processing apparatus includes an image reading means which reads an image of a document and outputs image data, a memory means which preliminarily stores predetermined image data, an image judging means for judging whether or not the image data of the read document is the same data as the stored predetermined image data, an image forming means for forming an image on a recording medium based on image data, and a control means which controls said image forming means to execute image formation based on the image data of the read document when the image data of the read document is judged to be different from the stored image data by said image judging means, and for controlling said image forming means to execute image formation by said image forming means based on the predetermined image data stored in the memory means when the read image data is judged to be the same as the stored predetermined image data.

In the function of the image information processing apparatus of the present invention as described above, with respect to individual original documents having original image information, inquiry information corresponding to each is preliminarily memorized. The inquiry information is bibliographic information for facilitating work to search out the original document such as the name of the original document, storage position, etc.

In the case where the document to be processed by the apparatus of the present invention is the document reproduced from the original document, the code image data indicating the inquiry information is contained in the image data outputted by the image reading means. In other words, the reproduced document includes the image in which the original image and the code image for specifying the original document are composed.

Specific inquiry information is displayed based on the code image data, whereby an operator can readily find out about the original document on the basis of the reproduced document.

The code image for the reproduced document may be of an image obtained by encoding the inquiry information itself or of an image obtained, for example, by encoding the identification code imparted to the inquiry information. It is to be noted that the inquiry information is inputted through key operation by an operator, through wireless or radio communication by a transmitter, by network communication with external devices, etc.

On the other hand, upon reading of the image information of the original document, the image data is memorized as the original image information so as to correspond to the identification code, and thereafter, when the reproduced image corresponding to this original document is read, image formation is effected based on the original image information. Thus, even when the document is of the reproduced document, a reproduced item having the same image quality as in the reproduction by the original document may be obtained.

BRIEF DESCRIPTION OF THE DRAWINGS

These and other objects and features of the present invention will become apparent from the following description taken in conjunction with the preferred embodiment thereof with reference to the accompanying drawings, in which:

FIG. 8 is a main flow-chart explaining approximate processing contents by a CPU for generalizing control of the copying apparatus, FIG. 9 is a flow-chart explaining the processing corresponding to the reproduced document in FIG. 8, FIG. 10 is a flow-chart explaining information retrieving processing in FIG. 9, FIG. 11 is a flow-chart explaining the processing corresponding to the original document in FIG. 8, FIG. 14 is a diagram explaining one example of a padded image corresponding to one padded information, and FIG. 15 is a diagram showing on an enlarged scale, part of a reproduced image containing a padded image.

DETAILED DESCRIPTION OF THE INVENTION

Figure 1:
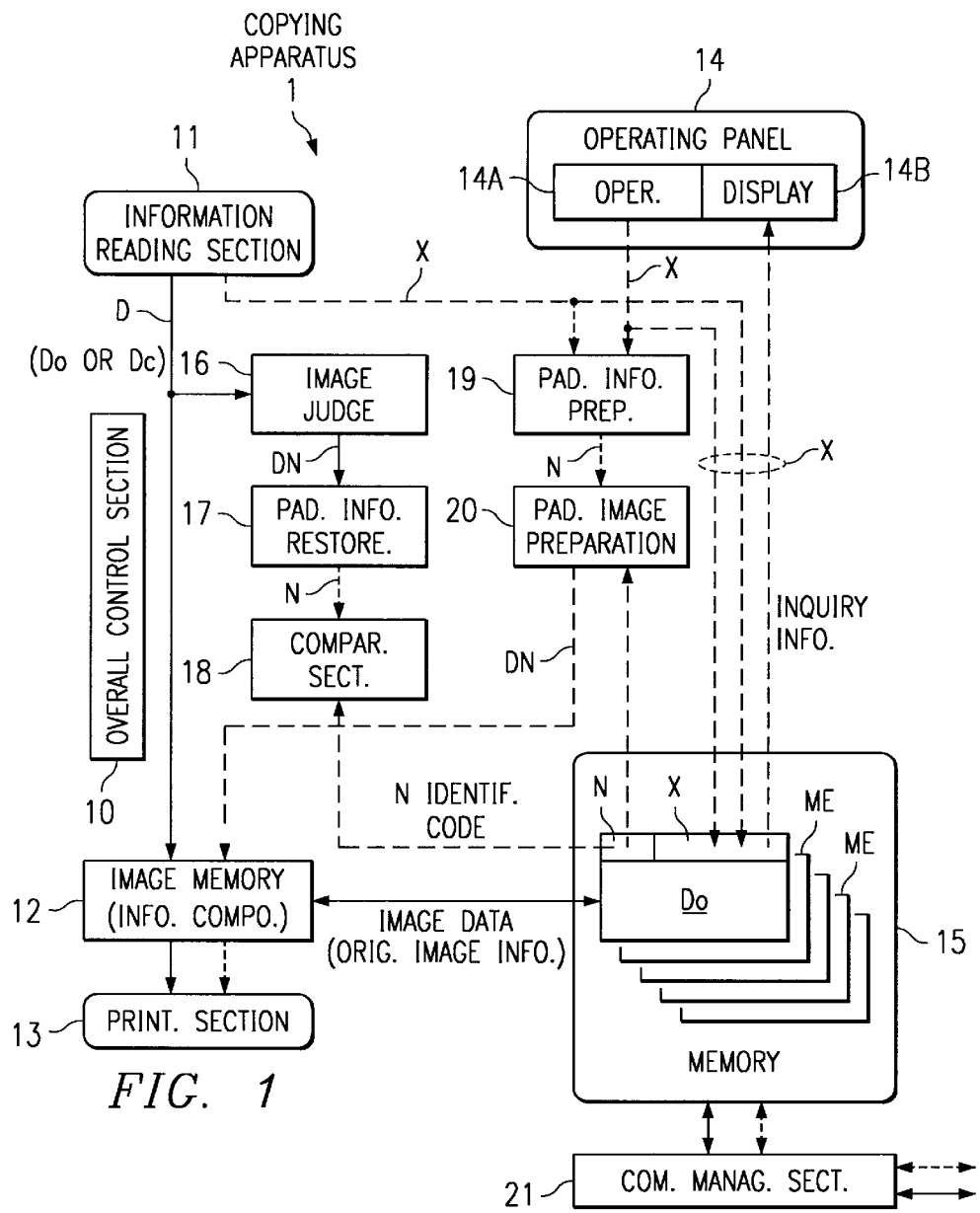
FIG. 1 is a block diagram illustrating the construction and function of a copying apparatus to which the present invention may be applied.

Before the description of the present invention proceeds, it is to be noted that like parts are designated by like reference numerals throughout the accompanying drawings.

Referring now to the drawings, there is shown in FIG. 1, a block diagram showing the construction and function of a copying apparatus to which the present invention may be applied. In FIG. 1, arrows in solid lines show flow of signals corresponding to image information X, while arrows in dotted lines indicate flow of signals corresponding to inquiry information.

In FIG. 1, the copying apparatus 1 is of a digital copying apparatus whose function is regulated by an overall control section 10, and may be utilized as an image information identification apparatus for an inquiry to find a source for copying of the document (For example, if the document is a copy of a book, the book itself), besides utilization thereof as an image information reproducing apparatus for reproducing an image of a document on a paper sheet (i.e., a copying apparatus). Moreover, the copying apparatus 1 functions to provide a copied image having an image quality equal to that as obtained from the original document even when the document is a reproduced document, i.e., the function to prepare the "child" copy at all times.

An information reading section 11 reads the image information of the document as finely divided into pixels for conversion thereof into image data D of 8 bits (256 gradations) for output. Moreover, the information reading section 11 receives radio signals emitted by a transmitter fixed to a particular document for demodulation, and outputs the inquiry information X obtained thereby (i.e., information representing name of the original document, storage place thereof, etc). It is to be noted that in the following explanation, the image data D corresponding to the original document is represented by image data Do, and the image data D corresponding to the reproduced image, by image data Dc for distinguishing therebetween in some cases.

The image data D is transferred to an image memory 12 so as to be temporarily stored therein. Meanwhile, at the image memory 12, the image of the original document is composed with a padded image to be described below. A printing section 13 reproduces the image composed by the image memory 12 on a paper sheet by a known electrophotographic process.

An operating panel section 14 is a man-machine interface, and includes an operating section 14A for outputting signals according to the key operation input by the operator, and a display section 14B for displaying types of information. The operator can input the inquiry information X through the operating section 14A.

A memory section 15, for example, a hard disk device is provided to alot a memory region ME of a predetermined capacity per each original document, and to memorize the inquiry information X and image data Do in correspondence identification code (identification number)N.

An image judging section 16 discriminates between the reproduced image and the original image of the documents by the presence or absence of the padded image, and in the case of a reproduced image having the padded image, the judging section 16 extracts the padded image data DN corresponding to the padded image from the image data Dc.

Here, the padded image is the image obtained by coding an identification code N, and is inconspicuously padded or embedded in the copied image during copying of the document. More specifically, in the copying apparatus 1 of the present embodiment, for the copying of the original document, the image of the document (i.e., original image) is not reproduced on a paper sheet as it is, but an image in which the original image is composed with the padded image is printed on the paper sheet, whereby the identification information (identification code N) of the original document is contained in the reproduced item (i.e., the "child" copy) by the copying apparatus in the form of the image information, and when the "child" copy is used as the document for copying, the copying apparatus 1 can recognize the "child" copy as the reproduction original.

A padded information restoring section 17 restores (or decodes) the identification code N of a predetermined number of bits (128 bits in this embodiment) from the padded image data DN.

A comparing section 18 retrieves or searches the contents stored in the memory section 15, and selects the memory region ME in which the identification code N coincides with the decoded identification code N. In this case, the inquiry information X of the memory region ME as selected is transferred to the display section 14B for display on a screen. At the time when the inquiry information X is displayed, the operator may stop the copying. In other words, in the above case, it may be regarded that the copying apparatus 1 was utilized as an image information identifying apparatus. In the case where the document is an original document, a padded information preparing section 19 imparts the identification code N to the original document.

Meanwhile, a padded image preparing section 20 encodes the identification code N received from either the padded information preparing section 19 or memory section 15 to prepare the padded image data DN, and by partially altering the image data Do in the image memory 12, composes the original image with the padded image. It is to be noted here that, at this point in time, in the case of a reproduced original, the image data Dc is replaced by the image data Do transferred from the memory section 15 in the image memory 12.

A communication managing section 21 communicates with other copying apparatus having a function equivalent to the copying apparatus 1, and realizes the information exchanges between the copying equipment.

Figure 2:
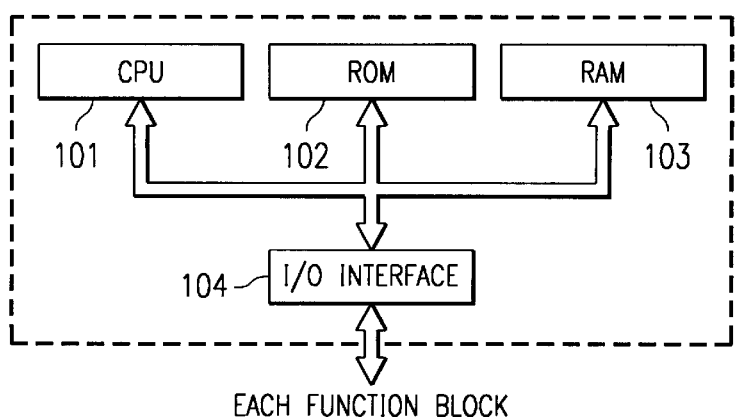
FIG. 2 is a block diagram showing the construction of an overall control section in the arrangement of FIG. 1.

FIG. 2 is a block diagram showing the construction of the overall control section 10.

The overall control section 10 includes a CPU (Central processing unit) 101, a ROM (Read only memory) 102 in which the program is stored, and a RAM (Random access memory) 103 which serves as a work area for executing the program, which are coupled to respective function blocks through an input/output interface 104 for sending and receiving control signals and various data.

Figure 3:
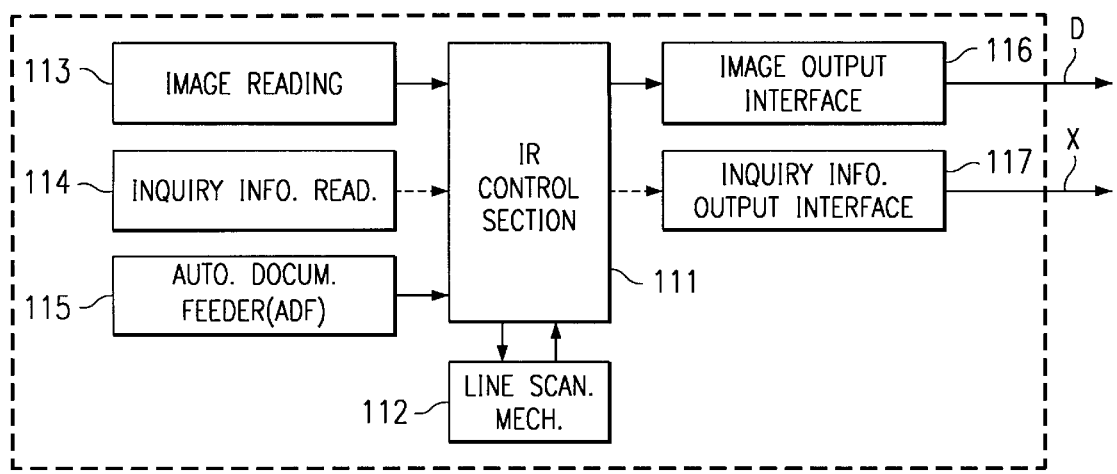
FIG. 3 is a block diagram showing the construction of an information reading section in the arrangement of FIG. 1.

FIG. 3 is a block diagram showing the construction of the information reading section 11.

The information reading section 11 includes an IR control section 111 having a CPU, a line scanning mechanism 112 provided with a scanner (not shown) to be displaced along a document face, an image reading section 113 which produces the image data D by the photoelectric conversion and quantization of reflected light from the document, an inquiry information reading section 114, an ADF (automatic document feeder) 115 for transporting documents to the reading position, an image output interface 116 for outputting image data D, and an inquiry information output interface 117 for outputting the inquiry information X, which are coupled to each other as shown.

Figure 4:
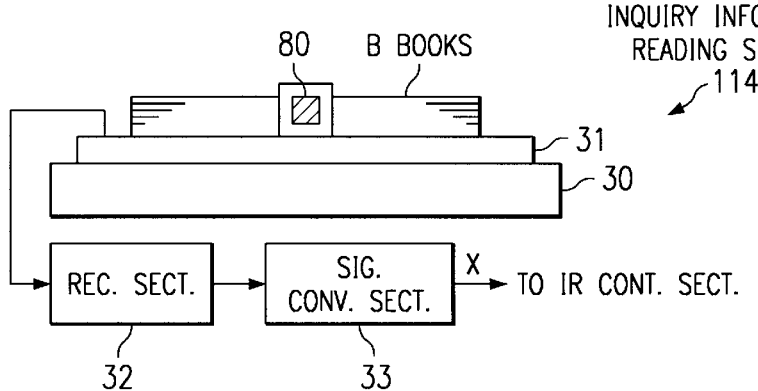
FIG. 4 is also a block diagram showing the construction of an inquiry information reading section in FIG. 3.

FIG. 4 is a block diagram illustrating the construction of the inquiry information reading section 114 in FIG. 3.

The inquiry information reading section 114 includes an antenna 31 made of a transparent electro-conductive material and provided on a document platform glass 30, and a receiving section 32 connected to said antenna 31 for demodulating radio signals and further, a signal converting section 33 which converts the demodulated signal into the inquiry information X of a predetermined format, and is further coupled to the IR control section 111.

In the embodiment of FIG. 4, a book B is placed as a document, on the document platform 30, and a transmitter 80 for transmitting the inquiry information X having the book name and book code as contents is attached to the book B.

The antenna 31 receives the radio signal emitted by the transmitter 80, and sends it to the receiving section 32. In other words, the inquiry information reading section 114 is provided to receive the inquiry information X by a wireless system, and becomes inactive when a document in general without a transmitter 80 is placed on the document platform 30. It is to be noted here that the reception of the radio signal should preferably be effected before document scanning in order to avoid reception disturbance resulting from noises during lighting of an exposure lamp. Meanwhile, it may be so arranged to attach the antenna 31 to a scanner so as to receive the radio signal by performing a preliminary scanning without lighting the exposure lamp.

Figure 5:
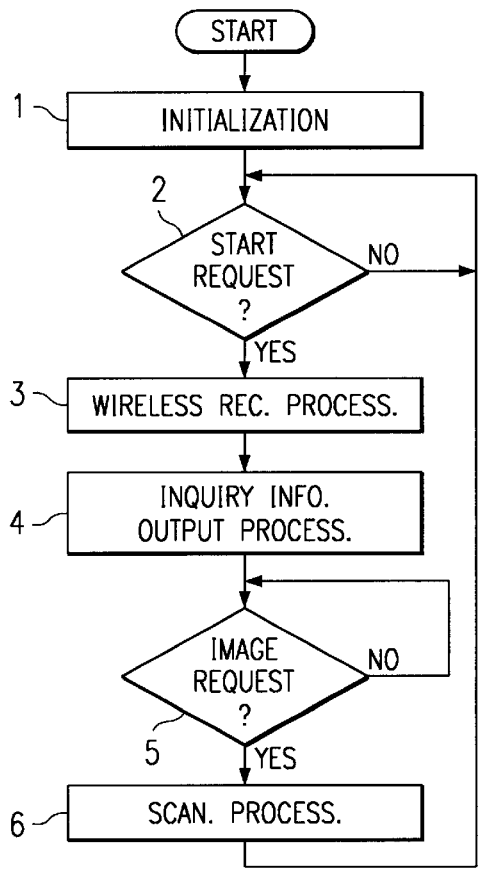
FIG. 5 is a flow-chart explaining the general functioning of an IR control section in FIG. 3.

FIG. 5 is a flow-chart showing a general function of the IR control section 111 of FIG. 3.

The IR control section 111 waits for a starting request from the CPU 101 after having initialized internal registers, etc. (Steps #1, #2). Upon receipt of the starting request, the radio or wireless reception processing and inquiry information output processing are sequentially executed (Steps #3, #4). Thus, upon receipt of the image request, the scan processing for output of the image data D is effected (Steps #5, #6).

Figure 6:
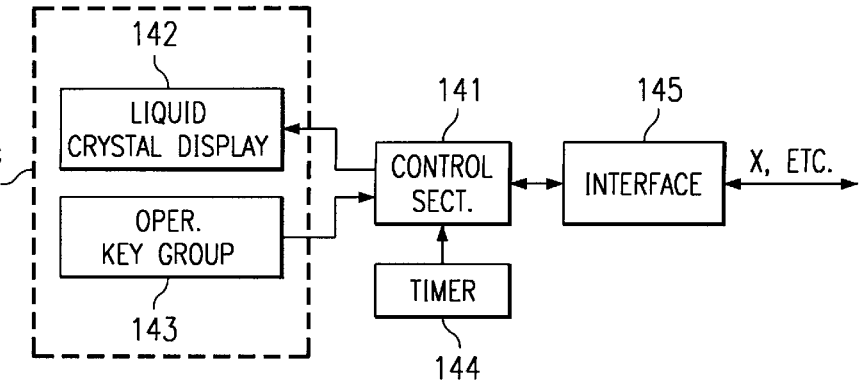
FIG. 6 is a block diagram showing the construction of an operating panel in FIG. 1.

FIG. 6 is a block diagram showing the construction of the operating panel section 14 in FIG. 1.

The operating panel section 14 generally includes an OP control section 141 mainly constituted by a CPU (not shown), an operating panel OP having a liquid crystal display 142 and a group of operating keys 143, both coupled to the OP control section 141, a time managing timer 144 backed up by a battery and also connected to the OP control section 141, and an interface 145 for signal transmission coupled to said OP control section 141 as shown.

Figure 7:
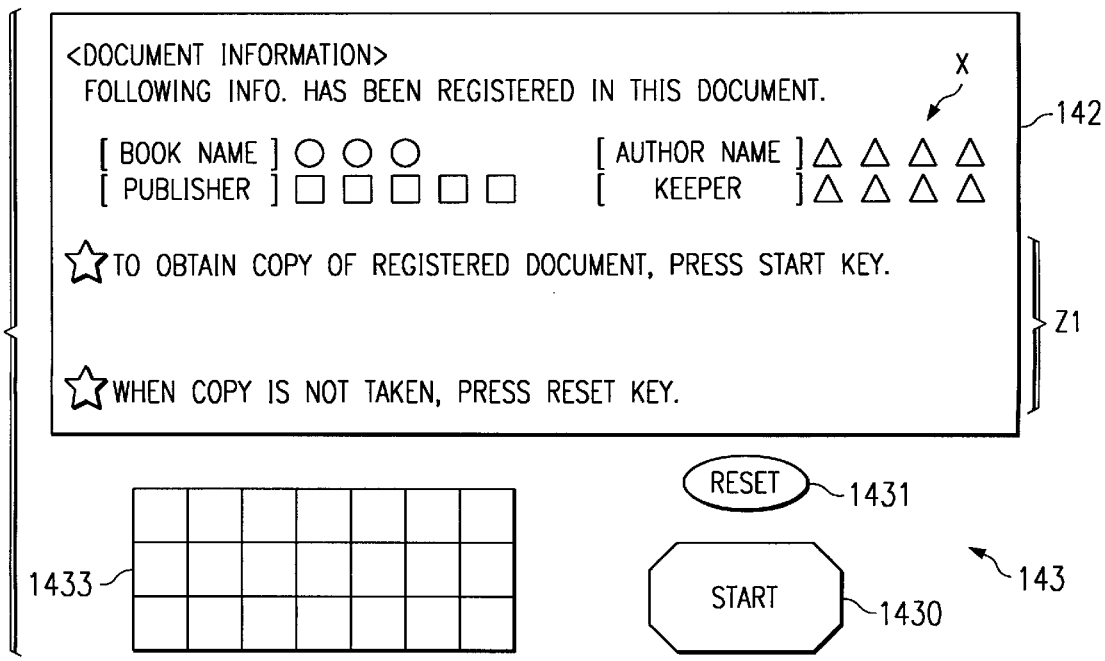
FIG. 7 is a schematic top plan view showing one example of a key arrangement on the operating panel.

FIG. 7 shows one embodiment for an arrangement of keys for the operating panel OP.

In the operating panel OP, under the liquid crystal display 14, there is disposed a start key 1430, a reset key 1431 and character keys 1433 for inputting the inquiry information X and copying conditions as the group of operating keys 143.

In the embodiment of FIG. 7, the inquiry information X includes such items as book name, keeper's name etc., and message Z1 for signaling the operator as to the necessity for continuation of the copying operation are displayed.

Subsequently, the functions of the copying apparatus 1 will be explained more specifically based on flowcharts.

FIG. 8 is a main flow-chart showing the general processing functions of the CPU 101 (FIG. 2) for regulating control of the copying apparatus 1.

Upon turning on a power source, the CPU 101 first initializes internal registers and RAM 103 (FIG. 2), and subsequently, carries out rising processing mainly directed to warming up of the image forming system for the electrophotographic process, and brings the copying apparatus 12 into a stand-by state (Steps #11, #12).

The CPU 101 waits for the key operation to be effected, and upon input of the inquiry information X by the key operation, memorizes the inquiry information X as input thereto (Steps #13, #14, #15).

In response to the instruction for copy starting, i.e., to depression of the start key 1430 (FIG. 7), the CPU 101 executes the information reading processing for sending the above start request and image request sequentially to the IR control section 111 (Steps #16, #17).

In this case, when the inquiry information X is received through the IR control section 111 (FIG. 3), the inquiry information X is memorized in a similar manner as the input of the inquiry information X by the key operation.

Then, an image judgement in which the value of the image data D is checked per each pixel for detection of presence or absence of a padded image is carried out, and if there is a padded image, the processing corresponding to the reproduced document is effected to return to Step #13, while in the absence of a padded image, the processing corresponding to the original document is executed, and return is made to Step#13 (Steps #18, #19, #20, #21).

FIG. 9 shows a flow-chart for the processing corresponding to the reproduced document.

As is clear from the foregoing description, this sub-routine is started when a reproduced document has been read.

The CPU 101 first decodes the identification code N from the padded image data DN, and retrieves the memorized contents to search a code coinciding with the decoded identification code memorized in the memory section 15 (Steps #31, #32).

When the result of the retrieval is a "hit", i.e., in the case where a stored identification code N coincides with the decoded identification code N value, the inquiry information X memorized in correspondence with the coincided identification code N is displayed on the screen of the liquid crystal display 142 (FIG. 6) (Steps #33, #36). Meanwhile, if the result of the retrieval search is a "non-hit", retrieval of the memorized contents of the other copying apparatus connected to the network is carried out (Steps #34, #35). By this arrangement, even when the document is a "child" copy prepared by the other copying apparatus, the inquiry information X that specifies the original document as the origin of copying can be displayed.

Following the display of the inquiry information X, the image data Do in the same memory region ME as the displayed inquiry information X is transferred to the image memory 12 from the RAM 103 (FIGS. 1, 2), and thus, the padding image is prepared so as to be padded in the original image (Steps #37, #38, #39).

Thereafter, the message Z1 as shown in FIG. 7 is displayed to wait for the operator instruction, and when the start key 1430 is depressed, the image data is read from the image memory 12, and print processing is executed for forming the copied image including the identification information. Upon depression of the reset key 1431, formation of the copied image is suspended for returning to the main routine. (Steps #40, #41).

FIG. 10 is a flow-chart for the information retrieval processing in FIG. 9.

When the identification code N to be compared with the decoded identification code N is present in the memory information, comparison is made sequentially one by one, and upon finding of the identification code N coinciding in value, the image data Do memorized in correspondence thereto is read so as to be retrieved from the RAM 103 (Steps #321 to #324).

FIG. 11 is a flow-chart for the processing corresponding to the original document in FIG. 8.

This sub-routine is started when the original document has been read. The CPU 101 stores the image data Do as the original image information in the memory section 15, and determines the value of the identification code N that corresponds to the original document information and the inquiry information X memorized earlier. (Steps #41, #42).

Subsequently, a padded image in which the identification code N is encoded is formed, the padded image and the original image are then composed within the image memory 12 (Steps #43, #44). Then, the print processing for preparing the "child" copy is executed and return is made to the main routine (Step #45).

Figure 12:
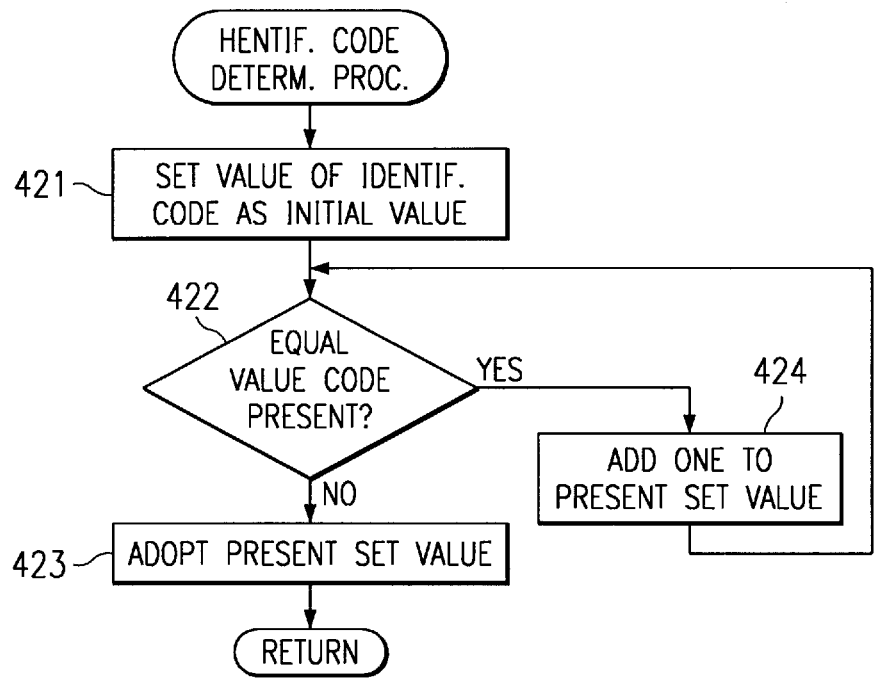
FIG. 12 is a flow-chart explaining the identification code determining processing in FIG. 11.

FIG. 12 is a flow-chart for the identification code determining process of FIG. 11.

The CPU 101 sets the value of the identification code which is to provide the read image data with an initial value, and searches the equal value of the code is memorized (present) or not in the memory section 15 (Steps #421, #422). In the case where the equal value as the set value is memorized (Step #422:Yes), the CPU 101 increases the value of the code and returns to the Step #422 (Step #424). When the equal value as the set value is not memorized (Step #422:No), the value set is determined as the value to be coded with the read image data (Step #423).

Here, in the case where a plurality of copying apparatus are connected by signal lines to constitute the network, if the range of the value of the identification code N is set for each copying apparatus 1, there is no obstruction in the information exchange between the copying apparatus.

Hereinafter, padding of the padding image into the original image will be specifically explained.

Figure 13:
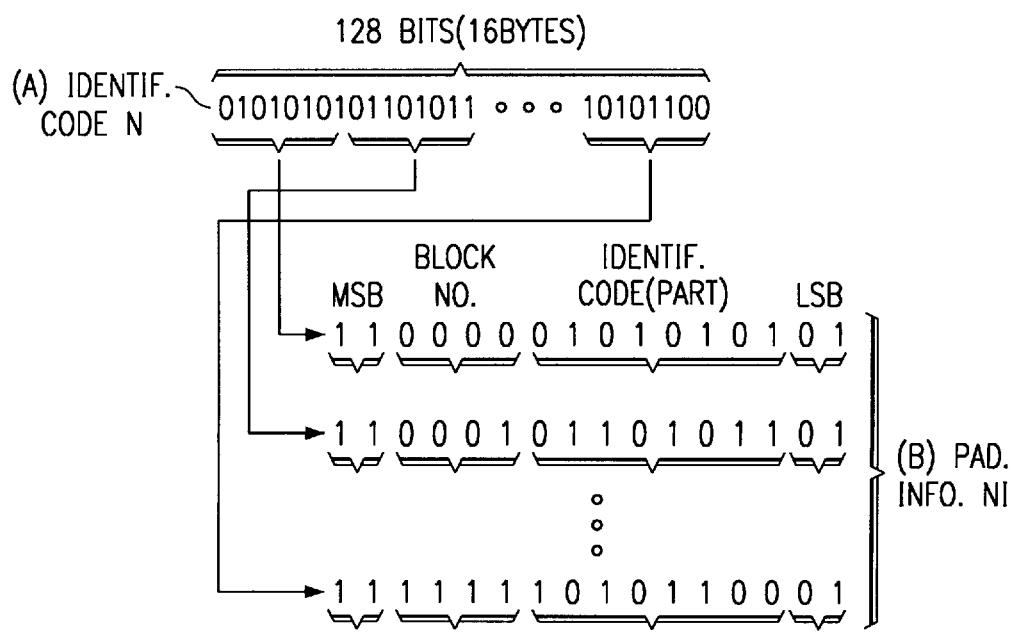
FIG. 13 is a diagram showing the relationship between the identification code and the padded information.

In the present embodiment, the identification code N which is the original information of the padded image, is binary data of a fixed length of 128 bits (16 bytes) as shown in (a) of FIG. 13. However, it is possible to make the identification code N to be of a variable length, and to increase the bit number according to the increase of the number of the memory region ME, whereby the size of the padded image may be reduced to the necessary minimum.

The identification code N is hidden in the copied image as the padded image. In other words, the padded image is provided not in a blank portion of the paper sheet, but as part of the original image (i.e., the image before padded) in a form incorporated so as not to be conspicuous.

For the above reason, in order to facilitate the incorporation of the padded image, particularly even when the original image is comprised of character images, the identification code N is divided into multiple 16-bit rows, byte by byte. As shown in (b) of FIG. 13, the 16-bit information NI (each having a length of 2 bytes) added with a 4-bit block number, a 2-bit MSB and a 2-bit LSB for each row are formed. The padded information NI is dispersed in the copied image. It is to be noted here that in order to prevent the erroneous restoration, each padded information NI is provided at least at two places.

The block numbers provide information for arranging the 16 pad information NI in correct order for decoding the 16 byte identification code N. Meanwhile, MSB and LSB are provided to facilitate discrimination between the padded image and the other image.

FIG. 14 is a diagram showing one example of the padded image Gni corresponding to one padded information NI, and FIG. 15 is a diagram showing, on an enlarged scale, part of the copied image containing the padded image Gni.

In FIG. 14, the padded image Gni includes 34 pixels g aligned in one direction. Each bit of the padded information NI is adapted to correspond to every other pixel in the pixel row, and if the value of each bit is "0", the density of the corresponding pixel g is set to be the same as that of the pixels g therearound, while if the value of each bit is "1", the density of the corresponding pixel g is adapted to be slightly weaker than that of the pixels g therearound.

In the case where the image forming system has a resolution of 400 dpi, the length of the padded image Gni becomes about 2.35 mm. In the ordinary character image, since many dark color portions in the size of this extent are present, the padded images Gni of 16× n pieces equivalent to n pieces of identification code N may be padded without any obstruction.

It is to be noted here that the padding image Gni can be padded at any position in any orientation. Moreover, for making it possible to decode the identification code N even in the case where soiling takes place or partial cutting off or pasting is effected, it is also possible to pad many padding images Gni in directions different from each other. In that case, it is preferable to determine the effective identification code N by majority, with the number of sets adapted to be an odd number, in preparation for a case where errors take place in the decoding of part of the padded information NI. Furthermore, in the case where an original image is of an intermediate or half tone, etc., it is possible to improve the look of the image by adjusting the image density around the padded image for simultaneous facilitation of identification thereof.

It is to be noted here that, in the foregoing embodiments, although the description has been made that the image data Do when the original document was read is memorized as it is, and at the point in time for the print, the image data Do and the padded image data DN are to be composed, the arrangement may, for example, be so modified to memorize the preliminarily composed image data, and upon printing, the composing treatment is omitted for processing at higher speed.

It should also be noted that in the foregoing embodiments, although the identification code N corresponding to the inquiry information X is encoded and padded in the copied image, the inquiry information X itself may be padded. Meanwhile, the information specifying an original document may be printed at positions not overlapping the original image such as at an end portion on the surface of reverse surface or the printing paper, etc. In such a case, the shape of the information is not limited to the pixel pattern of a predetermined density, but may be of a code image such as a bar code, or an image readily readable by an operator such as a character image.

In the foregoing embodiment, if the history of selection is memorized with respect to each memory region ME, it becomes possible to sum up the frequency for utilizing the original document, and thus, the copying apparatus 1 may be effectively used for document management in which, for example, a frequently used document is stored so as to be readily taken out, or if the document is not utilized it is discarded.

Furthermore, in the foregoing embodiment, although there has been explained the arrangement in which copying is executed based on the image data Do of the original document stored in the copying apparatus when the copied document is read, it may be so modified that, by comparing the image data Dc of the copied document with the image data Dc as memorized, when the image data Do and Dc do not coincide with each other, copying is executed based on the image data Dc. In other words, a comparing section is provided for comparing the image data Dc read by the information reading section 11 and stored in the image memory 12, with the image data Do stored in the memory section 15 corresponding thereto. When the data of these images is in agreement with each other, the image data Do in the memory section 15 is read into the image memory 12 to execute the print processing at Step #41, while in the case of non-agreement therebetween, the image data Dc in the image memory 12 may be utilized as it is to execute the print processing at Step #41 (FIG. 9). In the arrangement as described above, even when an operator intends to effect copying through intentional modification of the image of the copying document, such copying is free from any obstruction.

In the above embodiment, although the example in which the inquiry information with respect to the original document is displayed on the display section has been explained, the arrangement may, for example, be so modified to print out the inquiry information as an output depending on necessity. Meanwhile, in the case where it is so arranged to cause the copying apparatus 1 to effect only the display or printing of the inquiry information X with respect to the original document, it is unnecessary store the image data Do in the memory section 15, but it may be so arranged to have the memory section 15 to store only the inquiry information X.

As is clear from the foregoing description, according to the present invention, when the document is to be reproduced by a copying apparatus, reproduced items based on the original document can be readily obtained, and moreover, other effects available from the present invention are as follows.

Since individual code images to be preliminarily provided in the reproduced document for specifying the original document may be reduced to a small scale, loss of the original image information may be suppressed to minimum, while providing many code information having the same information, accuracy for decoding the information may be readily improved.

It is possible to memorize the inquiry information at the proper time with respect to the newly added original document also as well as the existing original document.

Even when the document at hand is of a reproduced document, it is possible to obtain on the spot, a reproduced item equal in quality to that directly available from the original document, without taking time for exchange with the original document.

Furthermore, the particular work for memorizing the original image information may be dispensed with.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as included therein.

What is claimed is:

1. An image information processing apparatus, comprising:

an image reading means for reading an image of a document and for outputting read image data, a document judging means for judging whether the document is an original document or a reproduced document according to whether or not padding image data is present in the read image data, said padding image data comprising data which has been added to image data of an original document so as to be present only in an image of a reproduced document and in image data obtained from said reproduced document, said padding image data being associated with bibliographic information of the original document and being embedded in said image of said reproduced document in a form that is visually inconspicuous to an operator, means for converting said bibliographic information associated with said padding image data into a form readable by the operator, and control means for controlling said converting means to convert said bibliographic information associated with the padding image data present in the image data of the document into said form readable by the operator when the document is judged to be a reproduced document by said document judging means.

2. The image information processing apparatus as claimed in claim 1, further comprising memory means for storing the bibliographic information of the original document, and wherein the control means controls said converting means to convert the bibliographic information stored in the memory means into said form readable by the operator.

3. The image information processing apparatus as claimed in claim 1, further comprising:

memory means for storing said bibliographic information of the original document in correspondence with predetermined padding image data, and wherein said apparatus further comprises:

a retrieving means for retrieving the predetermined padding image data from the read document image corresponding to the bibliographic information stored in said memory means, wherein said control means controls said converting means to convert the bibliographic information stored in the memory means which corresponds to the predetermined padding image data retrieved by said retrieving means.

4. The image information processing apparatus as claimed in claim 1, further comprising:

a memory means for storing image data of the original document, an image forming means for forming an image on a recording medium based on the image data stored in said memory means, and a second control means for controlling said image forming means to form an image based on the image data stored in said memory means, when the document is judged to be a reproduced document by said document judging means.

5. The image information processing apparatus as claimed in claim 1, further comprising:

a memory means for storing image data of the original document in correspondence with predetermined padding image data, a retrieving means for retrieving the predetermined padding image data from the image of the reproduced document corresponding to the image data stored in said memory means, an image forming means for forming an image on a recording medium based on the image data stored in said memory means, and a second control means which controls said image forming means to form an image based on the image data stored in said memory means in correspondence to the predetermined padding image data retrieved by the retrieving means when the document is judged to be a reproduced document by said judging means.

6. The image information processing apparatus as claimed in claim 1, further comprising:

an input means for inputting said bibliographic information of the original document, a data forming means for producing padding image data associated with the bibliographic information, a composing means for preparing composed data based on the image data of an original document and the padding image data, an image forming means for forming an image on a recording medium based on the composed data, and a second control means for controlling said composing means to prepare composed data based on the padding image data and image data of the original document thereby to form an image by said image forming means based on said composed data, when the document is judged to be the original document by the document judging means.

7. An image information processing apparatus comprising:

input means for inputting bibliographic information of an original document, data producing means for producing padding image data associated with the bibliographic information, said padding image data comprising data to be associated with image data of the original document so as to be present only in an image of a reproduced document and in corresponding image data of said reproduced document, an image reading means for reading an image of a document and for outputting read image data, a document judging means for judging whether the document is an original document or a reproduced document according to whether or not said padding image data is present in the read image data, composing means for preparing composed data which includes both the image data of an original document and the padding image data, image producing means for producing an image on a recording medium based on the composed data, said padding image data being produced on said recording medium so as to be present in said produced image in a form that is visually inconspicuous to an operator, and control means for controlling said composing means to prepare said composed data and which controls said image producing means to produce said image on said recording medium based on said composed data, when the read document is judged to be an original document by said document judging means.

8. The image information processing apparatus as claimed in claim 7, further comprising a memory means for storing the padding image data and the image data of the original document so as to correspond to each other.

9. The image information processing apparatus as claimed in claim 7, further comprising:

a memory means for storing the image data of the original document in correspondence to predetermined padding image data, and a second control means for controlling said composing means to prepare composed data based on the predetermined padding image data and the image data stored in the memory means, thereby to form an image by said image forming means based on said composed data, when the document is judged to be a reproduced document by the document judging means.

10. An image information processing apparatus, comprising:

an image reading means for reading an image of a document and for outputting corresponding read image data, a memory means for storing predetermined image data, an image judging means for judging whether or not the read image data is the same data as the stored predetermined image data, an image forming means for forming an image of said document on a recording medium, and a control means for controlling said image forming means to form an image of said document based on the read image data when the read image data is judged to be different from the stored predetermined image data by said image judging means, and for controlling said image forming means to form an image of said document based on the predetermined image data stored in the memory means when the read image data is judged to be the same as the stored predetermined image data by the image judging means.

11. An image information processing apparatus in accordance with claim 10, further comprising:

a detector which detects padding image data present in the image data read by said image reading means, said padding image data being present in said image of said document in a form that is visually inconspicuous to an operator; and output equipment for outputting bibliographic information of said document corresponding to the padding image data detected by said detector as present in said image data, said bibliographic information being outputted in a form readable by the operator to provide said operator with information concerning said document.

12. An image information processing apparatus in accordance with claim 11, further comprising a memory for storing the bibliographic information of the document, wherein said output equipment outputs the bibliographic information stored in said memory to provide the operator with said information in said form readable by said operator.

13. An image information processing apparatus in accordance with claim 11, wherein said output equipment includes a display for displaying the bibliographic information of the document in said form readable by an operator.

14. An image information processing apparatus, comprising:

an image scanner which reads an image of a document and outputs image data;

a detector which detects padding image data present in the image data read by said image scanner, said padding image data being present in said image of said document in a form that is visually inconspicuous to an operator; and output equipment for outputting bibliographic information of said document corresponding to the padding image data detected by said detector as present in said image data, said bibliographic information not being present in the image data read by said image scanner, said bibliographic information being outputted in a form readable by the operator to provide said operator with information concerning said document.

15. The image information processing apparatus as claimed in claim 14, further comprising a memory for storing the bibliographic information of the document, wherein said output equipment outputs the bibliographic information stored in said memory to provide the operator with said information in said form readable by said operator.

16. The image information processing apparatus as claimed in claim 14, wherein said output equipment includes a display for displaying the bibliographic information of the document in said form readable by an operator.

17. An image information processing apparatus, comprising:

an input means for inputting bibliographic information of an original document;

a data producing means for producing padding image data associated with the bibliographic information;

an image scanner which reads an image of a document and outputs corresponding image data;

a padding image data judging means for judging whether or not the image data read by said image scanner includes the padding image data;

a document judging means for judging whether the image data is of the original document or of a reproduced document according to a result judged by said padding image data judging means;

a composing means for preparing composed data which includes both the image data of the original document and the padding image data;

an image forming means for forming an image on a recording medium based on the composed data, said padding image data being formed on said recording medium in a form that is visually inconspicuous to an operator; and a control means for controlling said image forming means to form an image based on the composed data when the read document is judged to be an original document by said document judging means.

18. The image information processing apparatus as claimed in claim 17, further comprising:

a memory which stores the padding image data and the image data related to a read original document to be prepared into composed data by said composing means.

19. An image information processing apparatus, comprising;

an image scanner for reading an image of a document and for outputting read image data;

a memory;

a judging means for judging whether or not the read image data has been previously stored in said memory;

an image forming means for forming an image of said document on a recording medium; and a control means for controlling said image forming means to form an image of said document based on the read image data when the read image data is judged to not have been previously stored in said memory by said judging means, and for controlling said image forming means to form an image of said document based on image data previously stored in said memory when the read image data is judged to have been previously stored in said memory by said judging means.

20. An image information processing apparatus, comprising:

image input means for inputting image data;

a detector for detecting padding image data present in the image data inputted by said image input means; and output equipment for outputting bibliographic information of a document from which said image data is obtained, based on the padding image data detected by said detector as present in said image data, said bibliographic information including at least a storage place of said document.

21. The image information processing apparatus as claimed in claim 20, further comprising a memory for storing the bibliographic information of the document, wherein said output equipment outputs the bibliographic information stored in said memory.

22. The image formation processing apparatus as claimed in claim 20, wherein said output equipment includes a display for displaying the bibliographic information of the document in a form readable by an operator.

23. An image information processing method, comprising the steps of:

inputting image data;

detecting padding image data present in the image data inputted during the inputting step; and outputting bibliographic information of a document from which said image data is obtained, based on the padding image data detected during the detecting step as present in said image data, said bibliographic information including at least a storage place of said document.

24. The image information processing method as claimed in claim 23, further comprising the step of storing the bibliographic information of the document, wherein said outputting step outputs the bibliographic information stored during the storing step.

25. The image formation processing method as claimed in claim 23, wherein said outputting step outputs the bibliographic information of the document by displaying the bibliographic information in a form readable by an operator.

* * * * *